INFORMATION STORAGE CIRCUIT

Filed June 20, 1961 5 Sheets-Sheet 1

INVENTOR.
BURTIS W. MEYER
HARDISON J. GEER
BY
Samuel E. Turner
ATTORNEY

April 13, 1965 B. W. MEYER ETAL 3,178,587

INFORMATION STORAGE CIRCUIT

Filed June 20, 1961 5 Sheets-Sheet 2

$M'10 = M'11\ [P1(I1) + P2(I2)]$ $M'10 = (M'11) \ldots M'1(n-1)\ [P1(I1) + \ldots P(In)]$ $$R10 = \underline{R10}\,[P1(S1+I1)+P2(S2+I2)]$$

$$R20 = \underline{R20}\,[P1(S1+R11)+P2[S2+R12]]$$

$$Rm0 = \underline{Rm0}\,[P1(S1+R(m+1)1)+P2(S2+R(m-1)2)]$$

INFORMATION STORAGE CIRCUIT

April 13, 1965 B. W. MEYER ETAL 3,178,587

INFORMATION STORAGE CIRCUIT

Filed June 20, 1961 5 Sheets-Sheet 5

3,178,587

INFORMATION STORAGE CIRCUIT

Burtis W. Meyer and Hardison J. Geer, both of Palo Alto, Calif., assignors to General Electric Company, a corporation of New York Filed June 20, 1961, Ser. No. 118,346
17 Claims. (Cl. 307—88.5)

This invention relates to information storage or registering circuits and particularly to circuits wherein information is represented by circuit activity during corresponding time intervals. The invention is of especial utility for the utilization of monostable elements and analogous devices in such circuits.

It is well-known in the computer art to use bistable elements as storage devices for binary information. In the usual manner of employment, the information stored by a bistable element is represented by the signal level at particular points of the bistable circuit and the signal levels control gating arrangements for performing logic operations. It is often necessary to maintain these signal levels within close tolerances thus necessitating close component tolerances with resultant high cost. Also to maintain these signal levels such circuits must assume a quiescent high current state thus consuming a relatively large amount of power. It is therefore desirable to provide computer circuits employing only pulses for information representation and logic operation wherein quiescent currents are low.

It is therefore an object of the invention to provide an improved information storage circuit.

Another object of the invention is to provide an information storage circuit of low power consumption and cost.

Another object of the invention is to represent information by the state of activity of circuit elements during corresponding time intervals.

These and other objects of the invention are achieved by providing an information representing structure which represents information by continually responding to a corresponding information related phase of a multiphase signal until inhibiting signals are applied to change its information representing state by causing it to assume a condition of responding to the phase corresponding to the new information. In a preferred embodiment of the invention monostable and analogous circuit elements are utilized in combination with a multiphase clock pulse generator whereby the astable period of operation of each circuit element overlaps the phases of the clock pulse signal such that the element may be triggered on only one selected phase of each cycle of operation of the clock pulse generator. In other words, the recovery time of the monostable circuit is chosen so that it overlaps the intervening phases. In an alternate embodiment, appropriately delayed output pulses from each circuit element are fed back to its input gating structure for inhibiting the triggering of the element on the intervening phases of clock pulses. Each phase of the clock signal corresponds to a separate one of the items of information to be represented. Thus that a circuit element is triggered to its astable or temporary state during a particular phase is indicative of the information stored thereby. To change the information representing condition of an element the triggering thereof is inhibited on all phases except the phase corresponding to the new information until the circuit is triggered once on the new phase. By appropriate logic interconnection of the storage circuits of the present invention, computer circuits such as multistage counters and registers may be formed.

The invention will be described more fully with reference to the accompanying drawings in which.

Figure 1:
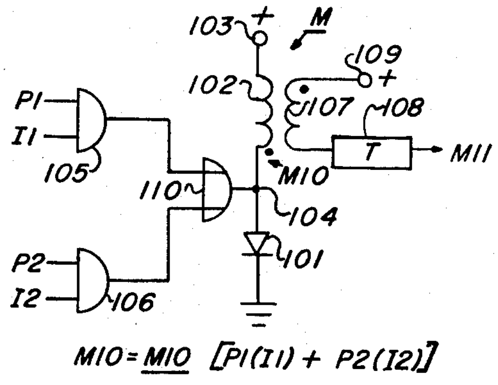
FIGURE 1 is a schematic diagram and logic equation of a tunnel diode monostable information representing circuit element.

Shown in FIG. 1 is a tunnel diode monostable circuit M and its logic equation as illustrative of a suitable monostable element for the practice of the present invention.

Figure 2:
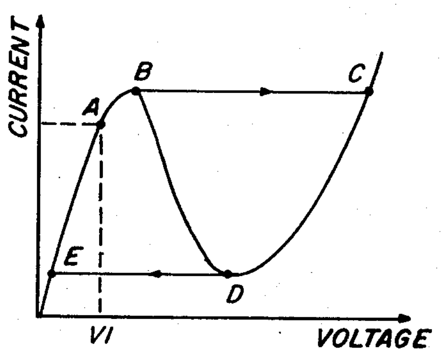
FIGURE 2 illustrates a current-voltage curve of a typical tunnel diode.

The basic monostable circuit comprises a tunnel diode 101 connected in series with an inductor 102 and a voltage source (not shown) connected to a terminal 103. The current-voltage curve of a typical tunnel diode is shown in FIG. 2. As is well-known a tunnel diode current-voltage characteristic has low voltage and high voltage positive resistance portions separated by a zone of negative resistance. Stable quiescent operation is achieved by selecting an applied voltage which establishes an operating point on a positive resistance portion of the characteristic. For example, for operation as a monostable circuit, a voltage V1 (FIG. 2) is applied to the terminal 103 (FIG. 1). This voltage establishes the operating point of the tunnel diode at a point A on the low voltage positive resistance portion of the characteristic.

Figure 3:
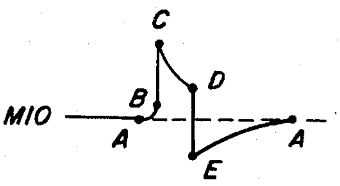
FIGURE 3 is an illustration of the voltage produced across the tunel diode in the operation of the circuit of FIG. 1.

The operation of the monostable circuit is as follows. A positive pulse is applied to a junction 104 between the inductor 102 and the tunnel diode 101 of sufficient magnitude to shift the operating point over the low-voltage current peak at a point B (FIG. 2). Reference is also made to FIG. 3 which illustrates the general waveshape of the voltage at the junction 104, indicated as a voltage M10, during operation of the circuit. Since operation is unstable beyond point B in the negative resistance portion, the circuit operation switches to a point C on the high-voltage positive resistance portion of the curve. However, applied voltage V1 is insufficient to sustain operation at point C and the voltage M10 drops along the characteristic curve to a point D, switches to a point E and then recovers to the stable operating point A. (Of course, monostable operation is also achieved by establishing an operating point along the high voltage positive resistance portion of the tunnel diode characteristic. In this case negative triggering pulses are applied.)

In accordance with the present invention the monostable circuit just described is triggered by pulses from a multiphase clock pulse generator. Information is represented by the monostable circuit by the fact of its being triggered on a particular phase of the multiphase generator. In other words each phase of the multiphase generator, is uniquely related to an item of information. Thus by the use of an $n$-phase clock pulse source $n$ items of information can be represented.

When the monostable circuit is being triggered on a given phase of the clock generator the circuit does not respond to pulses of the intervening phases because, in the embodiment of FIG. 1, it is arranged that the recovery time of the monostable circuit overlaps the intervening phases. This is an important point in the understanding of the operation of the monostable element of FIG. 1. The recovery time is determined primarily by the inductance of the inductor 102 and the characteristics of the tunnel diode 101 and these are chosen so that the recovery period overlaps $n-1$ phases of the $n$ phases of the clock pulse generator. Thus any reasonable number of clock generator phases may be used to represent a similar number of items of information provided only that the necessary overlap is obtained to prevent triggering on the intervening phases.

When it is desired to change the information being represented by the monostable element it is necessary to inhibit the clock pulses of all phases except the phase corresponding to the new information until the circuit is triggered once on the desired new phase. The circuit will then continue to be triggered on the new phase until a clock pulse of that phase is inhibited. This concept of inhibiting the triggering of the circuit to change its information representing state is a fundamental feature of the present invention and should be kept in mind in the following discussion.

For simplicity and ease of explanation, the invention is illustrated by circuits employing a two-phase clock system. Thus the circuits illustrated can represent or store binary information. Therefore if a circuit element is being triggered on one phase of a two-phase system it can be said to represent a binary "0." If it is being triggered on the other phase it can be said to represent a binary "1."

Figure 4:
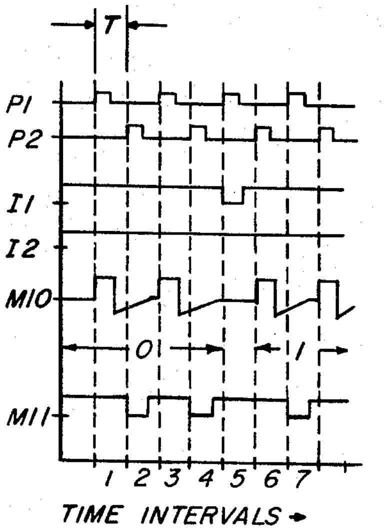
FIGURE 4 is a timing diagram illustrating the operation of the circuit of FIG. 1.

For a clearer understanding of the operation of the monostable element of FIG. 1, reference is now made to FIG. 4 which is a timing diagram of the voltages applied and developed in the operation of the circuit. The two phases of clock pulses are represented as signals P1 and P2. For purposes of explanation the monostable element will be considered as representing or storing a binary "0" when it is being triggered on the P1 phase and a binary "1" when it is being triggered on the P2 phase. Input signals are represented as I1 and I2 these signals normally being at a positive or arming level. The voltage across the tunnel diode 101 during each cycle of its astable operation is represented as M10, as previously mentioned in connection with FIG. 3.

Clock phase signal P1 and the corresponding input signal I1 are applied to a well-known AND gate 105 the output terminal of which is connected to a well-known OR gate 110. The output terminal of gate 110 is connected to the junction 104. Clock phase signal P2 and input signal I2 are applied to a similar AND gate 106. The AND gates employed in the illustrated circuits are of the well-known type which provide a positive output signal in response to the simultaneous presence of positive signals at its several input terminals but does not provide an output signal if the signal at any one of its input terminals is at a relatively low or disarming level. The OR gates employed in the illustrated circuits are of the well-known type which provide a positive output signal in response to a positive signal at any one or more of its several input terminals.

It is assumed that the circuit is initially being triggered on clock phase P1. Thus during the time interval 1 of the timing diagram of FIG. 4, a P1 pulse is applied to gate 105. Also during time interval 1 the input signal I1 is at a high level thus arming gate 105 whereby the P1 pulse causes a triggering pulse to be applied by gate 110 to the junction 104. This triggers the circuit to its astable state as previously explained thus producing a waveshape during interval 1 at the junction 104 as indicated by M10 of the timing diagram.

During the time interval 2 a P2 pulse is applied to gate 106 in coincidence with an enabling or arming level of input signal I2 and thus a triggering pulse is applied to the junction 104 during the interval 2. However, the circuit has not yet recovered from being triggered during interval 1 and therefore it is not triggered by the P2 pulse. In the timing diagram of FIG. 4 it will be noted that the waveshape of M10 is drawn to show this overlap of the P2 pulse by the recovery time. Thus the circuit continues to be triggered on the P1 phase until a P1 pulse is inhibited by the gating structure. Thus the circuit is again triggered on the P1 phase during time interval 3 and the P2 pulse occurring during time interval 4 has no effect.

To illustrate the inhibiting of a P1 phase clock pulse to thus change the information representing condition of the circuit, the input signal I1 is shown as being at a low or disarming level during the occurrence of the P1 pulse during time interval 5. Because the gate 105 is now disarmed the P1 pulse during interval 5 does not result in a triggering pulse at the junction 104. The circuit is therefore in a recovered condition upon the occurrence of the P2 pulse during time interval 6. Since the gate 106 is armed at this time by the high level of the input signal I2 the circuit is triggered during interval 6 as indicated by M10. The circuit will now continue to be triggered on the P2 phase, thus now representing a binary "1," until a P2 phase pulse is inhibited by application of a low level or disarming I2 signal. In the manner just described the monostable element of FIG. 1 is capable of storing binary information. The binary information representing condition is also indicated on the timing diagram of FIG. 4 beneath the signal M10.

Output signals are obtained in the circuit of FIG. 1 by means of an output winding 107 coupled to the inductor 102. The change of current in the inductor 102 when the circuit is triggered induces a signal in the winding 107. The signal developed in winding 107 is fed to a delay line or delay circuit 108 from which output signals, represented as an output signal M11, are obtained.

A terminal 109 of the winding 107 is connected to a source of positive voltage thus the signal M11 is normally at a high or arming level. When the circuit is triggered to its astable state a negative pulse is produced across the winding 107 due to its polarity with respect to inductor 102 as indicated by the conventional polarity dots. This negative pulse causes the signal M11 to drop to a low or disarming level after the delay introduced by delay line 108. The delay line 108 may be of any well-known type and its purpose is to delay the disarming pulses from the winding 107 so that they coincide with the pulses of a predetermined one of the clock phases whereby logic operations may be performed as will become apparent from the discussion hereinafter of various circuits formed of the monostable elements of the invention. The amount of delay is indicated by a legend within the box representing the delay lines such as delay line 108. Thus in FIG. 1 the delay line 108 has a delay of T where T is the time between the clock phases P1 and P2. With this amount of delay it can be seen from FIG. 4 that if the circuit is triggered on a given clock phase of a two-phase clock system a disarming pulse of signal M11 occurs in coincidence with the next clock pulse of the other clock phase. For example, during the time interval 1 of FIG. 4, the circuit M is triggered by the P1 pulse and the resulting inhibiting pulse of the signal M11 occurs during time interval 2 in coincidence with the P2 pulse. It is to be realized that the signals shown in the timing diagram of FIG. 4 (and in the other timing diagrams) are for purposes of illustration and in practice the signals may depart somewhat in amplitude, width and shape from those shown. For example the clock pulse would ordinarily be relatively narrower than those shown. In such event the delay of delay line 108 would be chosen to be somewhat less than T so that the pulses of signal M11 would be centered on the clock pulse.

The structure of the monostable element of FIG. 1 is also defined by the logic equation or diagram shown in FIG. 1. The only departure from well-known logic notation is the expression $\underline{M10}$ on the right hand side of the equation. The expression $\underline{M10}$ is used to denote the inhibiting feature of the circuit due to the above-discussed overlap of intervening clock phases by the recovery time of the circuit. Thus the expression $\underline{M10}$ indicates that the circuit of FIG. 1 will not be triggered during a given time interval if it was triggered during the previous time interval even though the other conditions for triggering are met, namely, P1 AND an arming level of I1 or P2 AND an arming level of I2. The logic equation thus also defines the circuit of FIG. 1 as an element which represents information by the fact of its being triggered on a corresponding clock phase and that to change its information representing state it is necessary to inhibit triggering on all phases except the phase corresponding to the new information until the circuit is triggered once on the new phase. There now follows a description of a two-phase clock pulse generator suitable for use with the illustrated embodiments of the invention.

Figure 5:
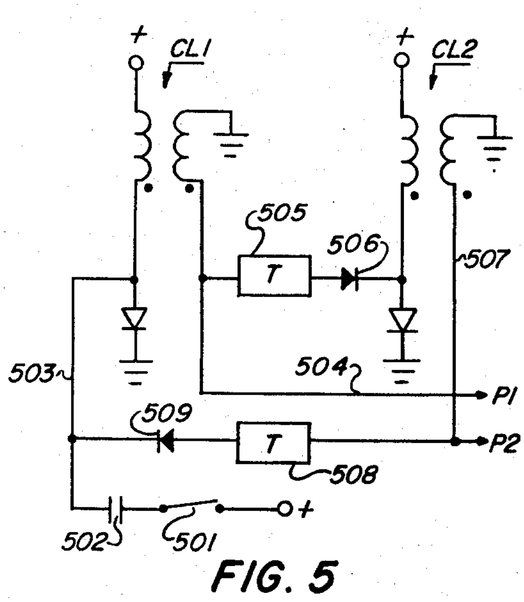
FIGURE 5 is a schematic diagram of a two-phase clock pulse generator.

Shown in FIG. 5 is a two-phase clock pulse generator formed of a pair of tunnel diode monostable circuits CL1 and CL2. Operation of the circuit is initiated by closing a switch 501 wihch connects a source of positive voltage to a capacitor 502. The resulting pulse on a lead 503 triggers circuit CL1. The output windings of each of the circuits CL1 and CL2 are connected to produce a positive pulse when the respective circuit is triggered. Thus when circuit CL1 is triggered by the closure of switch 501 a positive pulse is produced on a phase P1 line 504. This pulse is also applied to a delay line 505 having a delay time of T, that is, a delay time equal to the desired time between the clock phases. Therefore, after the delay time T the pulse emerges from delay line 505 and is applied through a conventional diode 506 to trigger the circuit CL2. When circuit CL2 is triggered a positive pulse is produced on a phase P2 line 507. This pulse is also applied to a delay line 508 also having a delay time T. When the pulse emerges from delay line 508, it is applied through a conventional diode 509 and over the lead 503 to again trigger circuit CL1 and start a second cycle of operation. Thus once operation of the clock pulse circuit is initiated it continues to produce two phases of clock pulses with the pulses of the two phases spaced by a time T as shown in FIG. 4. For purposes of the present disclosure the period of a cycle of operation of an *n* phase clock pulse signal generator is defined as the time between the leading edge of the pulse of the first phase and the trailing edge of the pulse of the *n*th phase. Thus, for the two-phase generator of FIG. 5 the period of a cycle of operation is equal to the width of two pulses plus the space therebetween.

The tunnel diode monostable element of FIG. 1 presents the advantages of low power consumption and the capability of high speed operation. However the invention is not limited to the use of tunnel diode monostable elements nor to elements which are inherently monostable. As stated hereinbefore, the essence of the invention is the provision of an information representing structure which represents information by the fact of being continually responsive to a selected phase of a multiphase signal until inhibiting signals are applied to change its information representing state by causing it to assume a condition of responding to the phase corresponding to the new information. Thus any one of many forms of signal responsive circuits may be used in the information representing element of the present invention, such for example as a well-known blocking oscillator circuit, a monostable multivibrator or the like. Bistable circuits may also be used if provision is made for appropriate resetting as for example by a separate reset pulse train.

In the employment of some of the possible circuits it may be difficult to arrange the recovery time so that it overlaps the intervening clock phases and inhibits the response of the circuit to the pulses of the intervening phases as is necessary for operation according to the present invention. Therefore an alternate embodiment of the invention is illustrated in FIG. 6 wherein a delayed output pulse of the circuit element is employed to inhibit response to each of the intervening phases.

Figure 6:
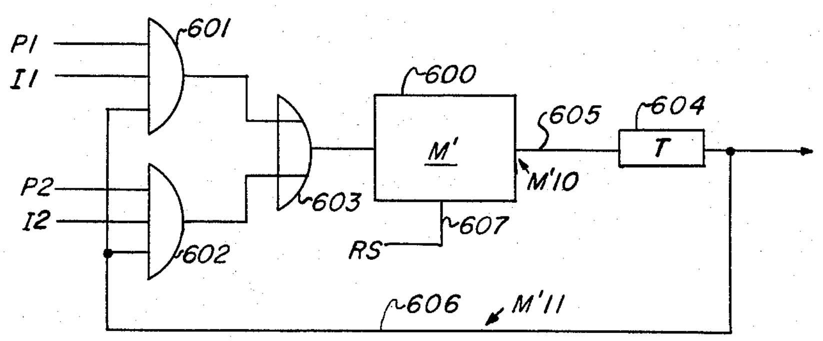
FIGURE 6 is a schematic diagram and logic equations of an alternate embodiment of an information representing circuit element.
Figure 7:
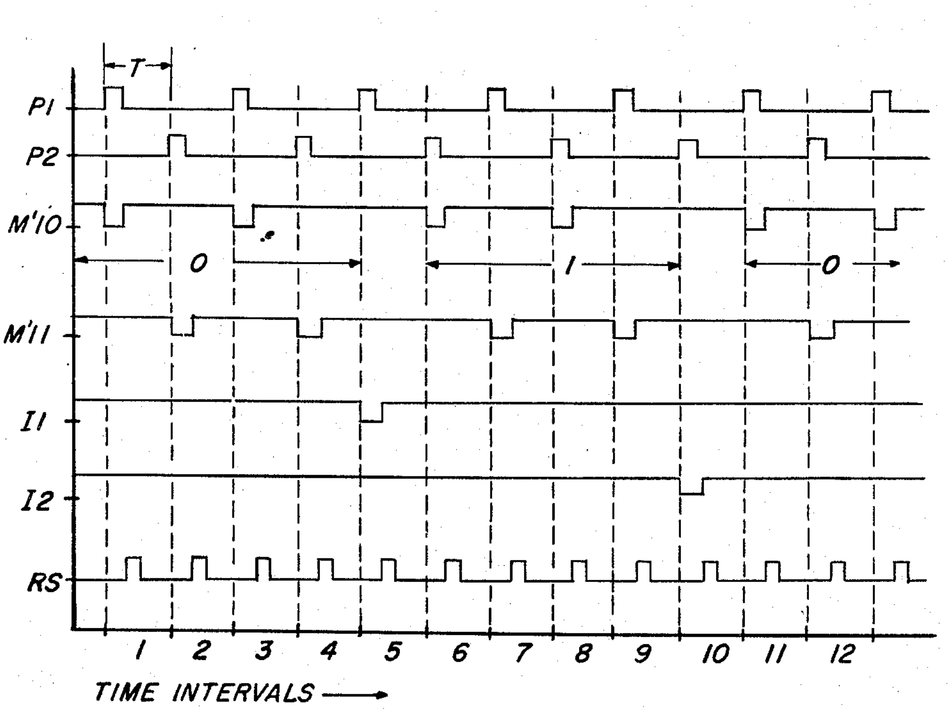
FIGURE 7 is a timing diagram illustrating the operation of the circiut of FIG. 6.

Shown in FIG. 6 is a circuit 600 which may be any one of many signal responsive circuits as discussed above. The circuit 600 is also legended M' in FIG. 6. The input gating circuitry of the information representing element of FIG. 6 comprises a pair of AND gates 601 and 602 and an OR gate 603 for applying triggering signals to the circuit M'. An output signal M'10 of the circuit M' appears on a lead 605 connecting an output terminal of circuit M' to the input terminal of a delay line 604. The signal M'10 is normally at a high or arming level (as shown in FIG. 7) and it falls to a low or disarming level when the circuit M' is triggered to its astable state. The output terminal of the delay line 604 is connected by a lead 606, upon which appears a signal M'11, to respective input terminals of the gates 601 and 602. The signal M'11 is the signal M'10 delayed by a time interval T so that it coincides in time with the next pulse of the clock signal phase following the phase on which the circuit M' was triggered.

An example of the operation of the circuit of FIG. 6 is shown by the timing diagram of FIG. 7. As shown in the timing diagram the circuit M' is initially being triggered on the P1 phase as indicated by the signal M'10. Thus during time interval 1 the gate 601 is armed by the high or arming levels of the signals I1 and M'11. Therefore the P1 pulse of interval 1, through gates 601 and 603, causes the triggering of the circuit M'. This results in a negative going pulse of the signal M'10 which is applied to delay line 604 and emerges therefrom during the time interval 2 as a negative going pulse of signal M'11. This negative pulse of signal M'11 is applied to gate 602 during time interval 2 in coincidence with an arming level of signal I2 and a P2 pulse thus disarming gate 602 and inhibiting the triggering of the circuit M' on the P2 phase. The circuit is triggered again on the P1 phase during time interval 3 and the resulting negative pulse of signal M'11 again inhibits triggering on the P2 phase during time interval 4.

To illustrate a change in the information representing state of the circuit of FIG. 6, the input signal I1 is shown with a negative going or disarming pulse during the time interval 5. This pulse disarms the gate 601 and inhibits triggering on the P1 phase. Since the circuit is not triggered, no inhibiting pulse of the signal M'11 is produced. Thus during the time interval 6 both of the signals M'11 and I2 are at a high level to arm the gate 602. Therefore the P2 pulse through gates 602 and 603 triggers the circuit M' during the time interval 6. Now the resulting inhibiting pulse of the signal M'11 occurs in coincidence with the P1 phase such as during time interval 7. Thus once the circuit is triggered on a particular phase, it continues to be triggered on that phase, with the intervening phases being inhibited, until an inhibiting pulse is applied in coincidence with the particular phase to the corresponding input gate.

As mentioned hereinbefore the circuit M' may be a bistable circuit. In this event it is necessary to provide a structure for resetting the bistable device so that its operation is analogous to monostable operation. Thus if the circuit M' is a bistable device a reset signal RS is applied to a lead 607 connected to the reset input terminal of the bistable device. This reset signal may be obtained in any of several ways; for example, the triggering pulse may be delayed and then applied to the lead 607. Alternatively, a timed reset pulse train RS may be provided as shown in the timing diagram of FIG. 7. Operation is otherwise the same as described above.

The structure of the information representing element of FIG. 6 is also shown by the logic equations or diagrams of FIG. 6. The first equation defines a two-phase element as shown schematically. The second equation defines the structure of a generalized *n*-phase element capable of representing *n* different items of information.

The information representing circuits of FIGS. 1 and 6 and variations thereof may be employed to form various computer circuits, examples of which will now be described.

Figure 8:
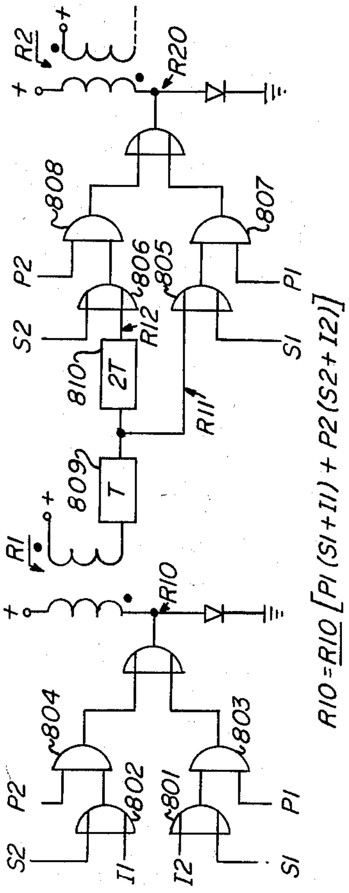
FIGURE 8 is a schematic diagram and logic equations of a shift register.

Shown in FIG. 8 is a pair of stages R1 and R2 and the logic equations of an *m* stage shift register formed of tunnel diode monostable elements according to the preferred embodiment of the present invention. A shift register is a useful and well-known type of computer circuit capable of receiving and shifting a pattern of information. In other words, the information representing state of each stage is transferred to the next successive stage during each shift cycle.

Figure 10:
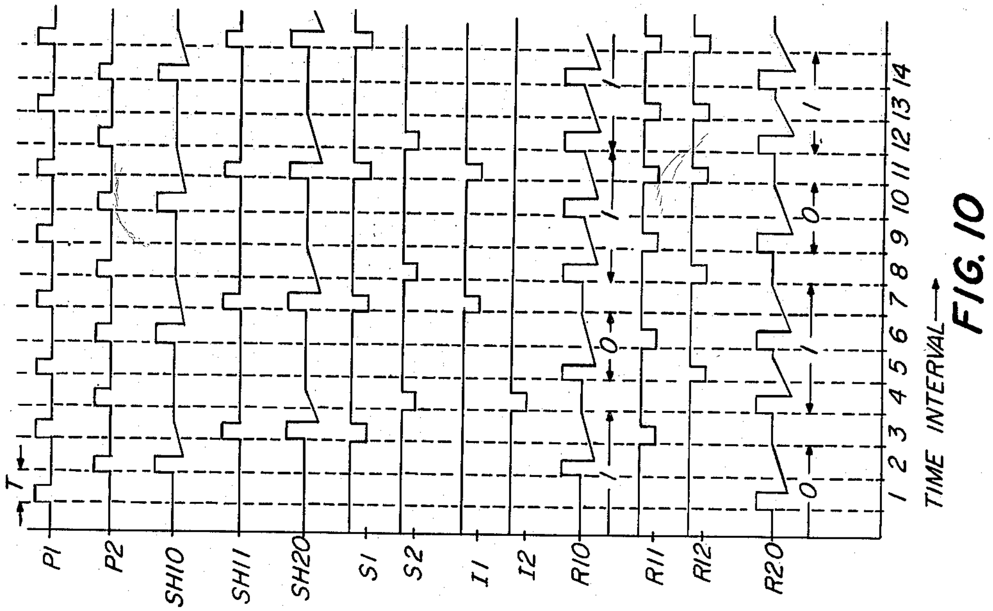
FIGURE 10 is a timing diagram illustrating the operation of the shift register of FIG. 8.
Figure 9:
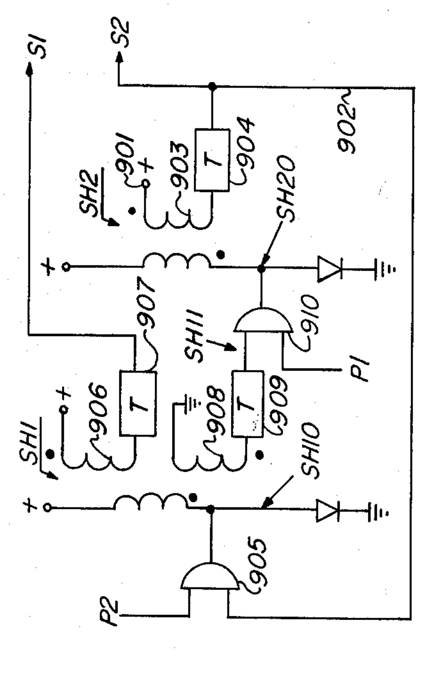
FIGURE 9 is a scehmatic diagram of a two-phase shift pulse generator for furnishing shift pulses for operation of the shift register of FIG. 9.

Preliminary to a complete explanation of the shift register of FIG. 8 reference is made to FIG. 9 which shows a shift pulse generator formed of a pair of tunnel diode monostable elements SH1 and SH2 which produce a pair of shift signal phases S1 and S2. Reference is also made to FIG. 10 which is a timing diagram showing various signals involved in the operation of the shift register and the shift pulse generator. While intermittent and controllable shifting systems could be designed and used with the shift register of FIG. 8, a continuous series of shift pulses is assumed for purposes of the present explanation. Therefore the shift pulse generator of FIG. 9 is designed to produce a continuous series of S1 signal pulses spaced to coincide with every other pulse of the P1 phase of the clock signal and a similar series of S2 signal pulses in coincidence with every other pulse of the P2 phase of the clock signal as shown in FIG. 10.

Turning now to the details of operation of the shift pulse generator of FIG. 9, it is seen that a positive voltage applied to a terminal 901 maintains a normally high or arming level of the S2 shift signal on a line 902 through a winding 903 and a delay line 904. The line 902 is connected to an input terminal of a well-known AND gate 905 to which the P2 clock signal is also applied. Thus during the time interval 2 of the timing diagram of FIG. 10 the clock pulse of the P2 phase occurs while the S2 signal is at an arming level. The monostable element SH1 is therefore triggered by a pulse from the gate 905 and produces a signal SH10 during the time interval 2 as shown in FIG. 10.

The triggering of element SH1 causes a negative going pulse across a winding 906 which is connected to a delay line 907. Delay line 907 has a delay time of T, as indicated, so that the pulse emerges and is applied to an S1 signal line in coincidence with the P1 pulse of time interval 3.

The triggering of element SH1 also causes a positive pulse across a winding 908. This pulse is delayed through a delay line 909 and the delayed pulse, indicated as a signal SH11, is applied to an AND gate 910. The P1 clock signal phase is also applied to this gate and, as may be seen from the timing diagram, the pulse of the SH11 signal and a P1 pulse occur during the time interval 3 thus causing an output signal from the gate 910 to trigger the element SH2 which produces the signal SH20.

The triggering of element SH2 causes a negative going pulse across the winding 903 which appears after the delay of delay line 904 as a negative going or disarming shift pulse on the S2 shift signal line 902. This S2 disarming pulse coincides with the P2 pulse during time interval 4 of the timing diagram thus inhibiting the triggering of element SH1. This completes one cycle of operation of the shift signal generator. When the next P2 pulse occurs during time interval 6 the S2 signal on line 902 is again at its arming level and the element SH1 is triggered to start a new cycle. The S1 and S2 shift signals are applied to the shift register of FIG. 8 at the points shown and a detailed explanation of the shift register operation will now be given.

The logic equations or diagrams shown in FIG. 8 define the input structure for triggering the stages of the shift register. For example the first equation states that a signal R10, due to triggering of the first stage R1, will be obtained if the stage has recovered from the last time it was triggered (this is indicated by the expression $\underline{R10}$) AND there is coincidence of a P1 pulse AND an arming level of shift signal S1, OR an input signal I1, OR coincidence of a P2 pulse AND an arming level of shift signal S2, OR an input signal I2. The second equation gives the structure for triggering the second stage R2 to obtain a signal R20 and the third equation is the equation of the *m*th stage.

For purposes of explanation it will be assumed that a stage represents or is storing a binary "0" if it is being triggered on the P1 clock signal phase and a binary "1" if it is being triggered on the P2 clock signal phase. This is indicated in the timing diagram of FIG. 10. Again it is pointed out that the information representing state of the monostable elements of the present invention is changed by inhibiting the triggering of the element on particular clock phases. Thus the shift signals S1 and S2, the input signals I1 and I2 and the output signals from each stage, such as a signal R11 and a signal R12 from stage R1, are normally at a high or arming level and are brought to a disarming or inhibiting level to control the input and shift of information in the shift register circuit.

The input logic circuit of each monostable element comprising a stage of the shift register is similar to that shown for stage R1 which includes a pair of well-known OR gates 801 and 802 and a pair of well-known AND gates 803 and 804. It is to be noted that all signals are labeled to indicate their association with a particular clock phase; for example, the pulses of signals I1 and S1 occur in coincidance with the pulses of the P1 clock phase.

According to the example of operation of the shift register represented by the timing diagram of FIG. 10, initially the stage R1 is being triggered on the phase P2 and stage R2 on the phase P1 thus representing a binary "1" and "0" respectively. According to shift register action the information contained in stage R1 is shifted to stage R2 during the next shift cycle and new information is entered into stage R1, where a shift cycle is defined as comprising a disarming or inhibiting pulse of the S1 signal and a following disarming pulse of the S2 signal. This operation during a shift cycle to transfer information from one stage to another is as follows: The stage R1 is triggered by the P2 pulse of time interval 2 as is shown by the signal R10 in the timing diagram of FIG. 10. The triggering of stage R1 causes a disarming pulse of the signal R11 which is delayed by a delay line 809 so that it is applied to the input of an OR gate 805 during the time interval 3. It is noted that a disarming pulse of the timing signal S1 also occurs during time interval 3; thus there is no output signal from the gate 805 to arm an AND gate 807 when the P1 pulse occurs during the interval 3. Therefore the P1 pulse is inhibited from triggering the stage R2 during interval 3 as indicated by the signal R20. The disarming pulse of the signal R11 during interval 3 is, of course, the indication to the input circuit of stage R2 that the stage R1 is storing a binary "1" which is to be shifted to the stage R2. Thus it is arranged, as just described, that upon occurrence of a disarming pulse of signal R11 during a shift cycle the stage R2 is inhibited from triggering on the P1 clock signal phase. This places the stage R2 in condition to be triggered by the next pulse of the P2 clock signal phase which occurs during time interval 4. It is seen from the timing diagram that during time interval 4 the shift signal S2 applied to an OR gate 806 is at a disarming level but that a signal R12 from a delay line 810 is at an arming level whereby an AND gate 808 is armed upon the occurrence of the P2 pulse. Thus the stage R2 is triggered on the P2 clock signal phase to thereby assume its "1" indicating state.

Meanwhile, during the interval 4, a "0" is entered into the stage R1. Note that during interval 4 the signals I2 and S2 are at a disarming level during the occurrence of the P2 pulse. Thus the stage R1 is inhibited from triggering on the P2 clock phase. During the interval 5 the stage R1 is in a recovered condition and signals I1 and S1 are at an arming level; therefore, the stage R1 is triggered upon occurrence of the P1 pulse during this interval to assume a "0" representing state. During the next shift cycle, which occurs during the time intervals 7 and 8 the "0" contained in stage R1, during the intervals 5 and 6, is shifted to stage R2 as follows. When stage R1 is triggered on the P1 clock phase during interval 5 a negative going pulse is produced which is delayed by the delay line 809. This pulse is further delayed by delay line 810 from whence it emerges as a disarming pulse of the signal R12 in coincidence with the P2 pulse during time interval 8. A disarming pulse of the shift signal S2 also occurs at this time; thus the AND gate 808 is disarmed and the triggering of stage R2 on the P2 clock phase is inhibited. During the interval 9 the coincidence of an arming level of signal S1 with the P1 pulse results in a triggering of stage R2 on the P1 clock phase to thus assume a "0" representing state.

The transfer of a "1" and a "0" from stage R1 to stage R2 and the entry of a "0" into stage R1 has now been described. Further details of the operation of the shift register are believed sufficiently evident so that further explanation is unnecessary.

Figures 11, 12:
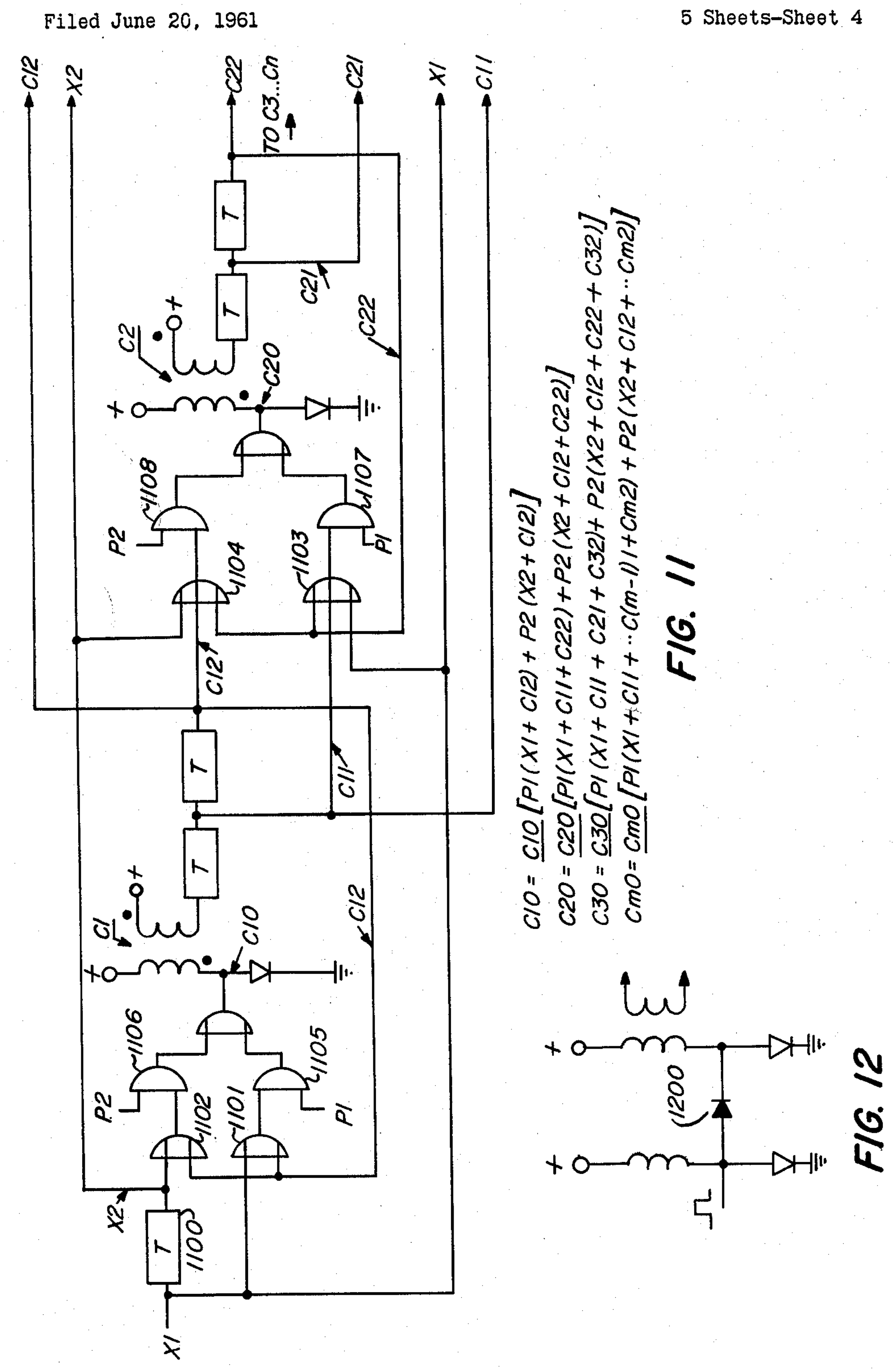
FIGURE 11 is a schematic diagram and logic equations of a counter circuit.
FIGURE 12 is a schematic illustration of a pair of cascaded tunnel diode circuits useful where the circuit must furnish large output power in response to low input power.
Figure 13:
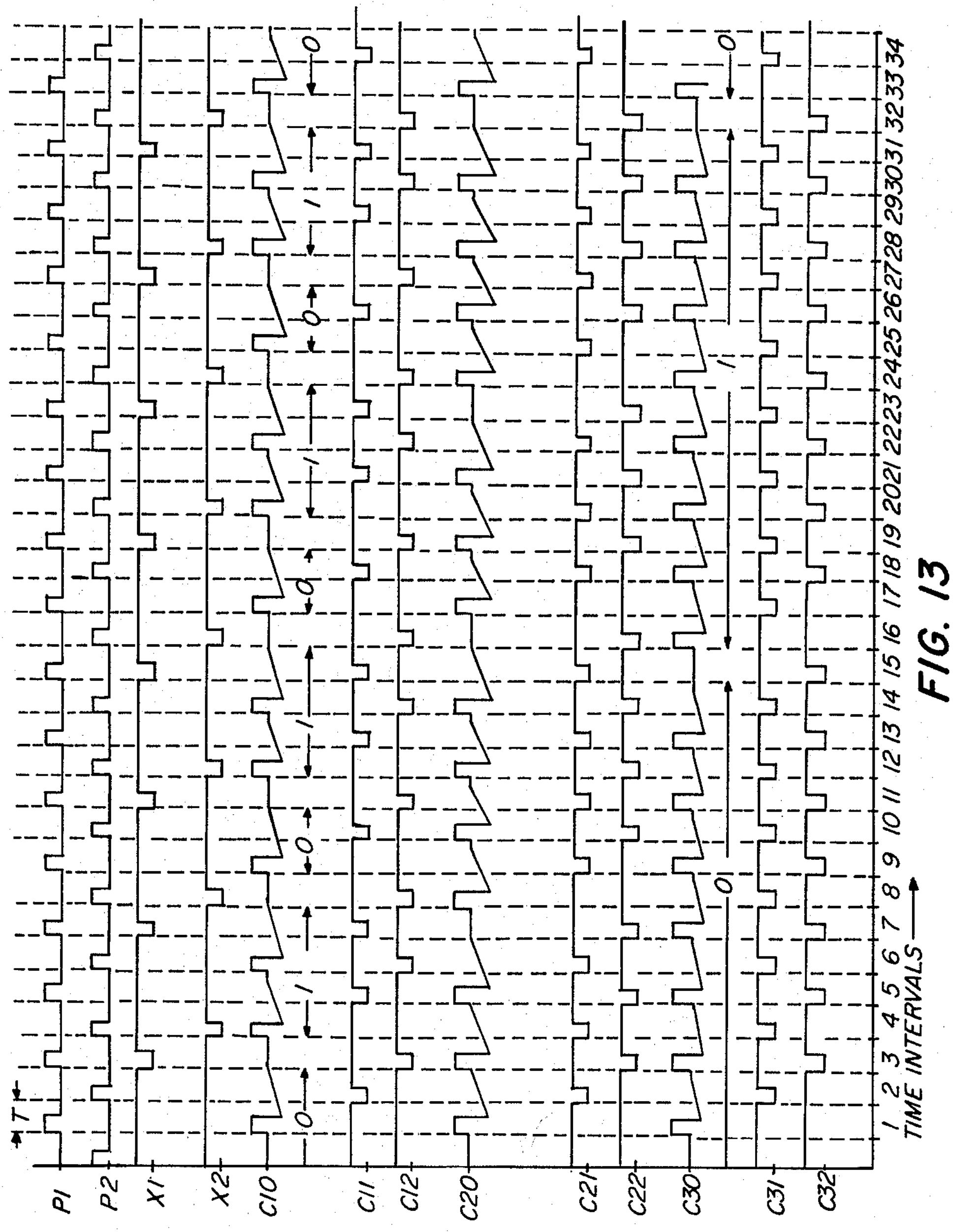
FIGURE 13 is a timing diagram illustrating the operation of the counter circuit of FIG. 11.

As another example of the application to computer circuitry of the information representing elements of the present invention, the diagram of the first two stages and logic equations of an *m* stage counter circuit is shown in FIG. 11. FIG. 13 is a timing diagram for the first three stages. It is reiterated that the monostable elements represent information by the fact of being triggered on a corresponding clock signal phase and that the information representing state is changed by inhibiting triggering on the present phase and then allowing triggering on the phase corresponding to the new information. Since a two-phase clock signal system is employed with the illustrated embodiment of a counter it can represent binary information and it is arranged to count in binary fashion.

Simultaneous carry is provided which requires that each stage receive state indicating signals from all lower order stages as is readily seen from the logic equations or diagrams.

The input signal to the counter, the pulses of which are to be counted, is designated a signal X1. This signal is normally at a high or arming level and the pulses to be counted are negative going portions of this signal which must occur in coincidence with the P1 clock phase. For purposes of illustration, the timing diagram of FIG. 13 shows the circuit receiving pulses to be counted at the maximum rate, namely, at one half the clock pulse rate. Thus the signal X1 is shown with a negative going pulse in coincidence with every other P1 pulse.

To perform the necessary logic it is required that a second phase of input signal be obtained in coincidence with the P2 clock phase. This is accomplished by applying the X1 signal to a delay line 1100, the signal from which is designated a signal X2. As shown in the timing diagram, a negative going pulse of the signal X2 coincides with every other P2 pulse.

A first stage of the M stage counter is designated a stage C1 and the second a stage C2 as illustrated in FIG. 11. The logic equations for the first three stages and for the *m*th stage are also shown. A signal C10 of the timing diagram of FIG. 13 indicates the triggering of stage C1. A pair of signal C11 and C12 are the delayed output signals from stage C1, the pulses of the signal C11 being delayed for a time T and the pulses of the signal C12 for a time 2T. Similarly, a signal C20 indicates the triggering of stage C2 and a pair of signals C21 and C22 are the delayed output signals therefrom. Signals for a third stage of the counter C3 are given in the timing diagram even though the circuit of stage C3 is not shown schematically. These signals are a signal C30 indicating the triggering of the stage C3 and a pair of delayed output signals C31 and C32.

The stages of the counter are similar with the exception that each successive stage has an additional input to each of its input OR gates such as a pair of OR gates 1101 and 1102 in the input circuit of stage C1 and a pair of OR gates 1103 and 1104 in the input circuit of stage C2. The input circuit of each stage also includes a pair of AND gates such as a pair of gates 1105 and 1106 in the input circuit of stage C1 and gates 1107 and 1108 in the input circuit of stage C2.

Selected examples of the operation of the counter circuit of FIG. 11 will now be discussed with reference to the timing diagram of FIG. 13. The binary information representing state of each stage is indicated under the respective signals C10, C20, and C30. Each stage is initially in the "0" representing state as indicated by the fact that each is triggered by the P1 pulse during time interval 1. The recovery period of each stage overlaps the time interval 2 so that none of the stages is triggered by the P2 pulse of this interval. The first of the pulses of the input signal X1 occurs during the time interval 3. This pulse, which is at a disarming level, is applied to one input terminal of the OR gate 1101. The signal C12 is applied to the other terminal of this gate and it is also at a disarming level in coincidence with the P1 and X1 pulses. Thus there is a disarming signal applied from the gate 1101 to the AND gate 1105 thereby inhibiting the triggering of stage C1 on the P1 phase during the interval 3. During the next interval, interval 4, a disarming pulse of the delayed input signal X2 is applied to one of the terminals of the OR gate 1102. However, the signal C12 which is applied to the other terminal of gate 1102 is now at an arming level. The output signal from gate 1102 therefore arms the AND gate 1106 and upon the occurrence of the P2 pulse the stage C1 is triggered thus assuming a "1" representing condition.

The stage C1 continues to be triggered on the P2 phase until it receives the next input pulse to be counted of the signal X1. For example, during the time interval 8 the simultaneous occurrence of a pulse of the delayed input signal X2 and a pulse of the signal C12 at the input terminals of gate 1102 inhibits triggering of stage C1 on the P2 phase and during interval 9 the stage C1 is triggered on the P1 clock signal phase.

When the lowest order stage C1 is in a "1" representing state, the next input pulse to be counted must result in a carry to the next higher order stage C2. If the stage C2 is in the "0" representing state, that is, being triggered on the P1 phase, this carry action occurs as shown in interval 7 when the simultaneous occurrence of disarming pulses of signals X1, C11 and C22 at the input terminals of OR gate 1103 result in a disarming signal to the AND gate 1107 and inhibits triggering of the stage C2 on the P1 clock phase thus conditioning stage C2 to be triggered by the next P2 pulse. During time interval 8 the arming level of signal C22 applied to OR gate 1104 results in the arming of AND gate 1108 in coincidence with the P2 pulse of interval 8. Stage C2 is thereby triggered on the P2 clock phase to assume a "1" indicating condition.

With the above examples in mind further operation of the counter circuit is believed evident with reference to the timing diagram, keeping in mind that the information representing state of each stage is changed by the application of inhibiting signals.

As mentioned hereinbefore, each stage of the counter must provide signals to each of the higher order stages. For example, the lowest order stage C1 (FIG. 11) provides the signals C11 and C12 to each of the higher order stages. Thus rather large output power is required from the lower order stages. To provide a monostable circuit which can be triggered with relatively low power but which will provide a relatively high output power, a pair of tunnel diode monostable circuits may be used in each stage and connected in cascade as shown in FIG. 12. The left hand tunnel diode may be a relatively low current type which acts as an amplifier of the triggering pulse to trigger the right hand tunnel diode through a conventional diode 1200. The right hand tunnel diode may then be a high current type which provides a relatively large output power.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. An information storage circuit comprising: a monostable element having a stable and an astable state; a cyclically operable multiphase clock signal generator producing clock signals for controlling the triggering of said element to its astable state; means connecting said generator to said element for applying each phase of said clock signals to said element, the time interval of the astable state of said element being at least equal to the period of a cycle of operation of said generator, said element being incapable of being triggered when in its astable state whereby said element can be triggered during only one phase of each cycle of operation of said generator.

2. An information registering circuit comprising: a monostable element having a stable and an astable state; a clock signal source having first through *n* phases and producing a clock signal during each phase for controlling the triggering of said element to its astable state; means connecting said source to said element for applying the signals of each of said *n* phases to said element; means for causing a given phase signal from said source to trigger said element to its astable state, said element being incapable of being triggered when in its astable state, and the time interval of the astable state of said element during which signals from said source are ineffective to cause triggering of said element being at least equal to the time interval including the first through *n* phases of said clock signal.

3. An information registering circuit comprising: a monostable element having a stable and an astable state; a cyclically operable clock signal source having *n* phases and producing a signal during each phase of its cycle for controlling the triggering of said element to its astable state; means connecting said signal source to said monostable element for applying the signals of each of said *n* phases to said element; means for causing a signal of a given phase from said source to trigger said element to its astable state, the time interval of the astable state of said element being at least equal to the period of the cycle of operation of said source; and means for rendering said signals from said source ineffective to cause triggering of said element when said element is in its astable state whereby said element can be triggered only once during each cycle of operation of said source.

4. An information registering circuit comprising: a monostable element having a stable and an astable state; a multiphase clock signal source producing a clock signal during each phase for controlling the triggering of said element to its astable state; means for applying a clock signal of a given phase from said source to cause triggering of said element to its astable state; means for subsequently applying clock signals of all other phases of said source to said element, the time interval of the astable state of said element being at least equal to the time required for the occurrence of one signal of each phase of said device but less than the time between successive signals of said given phase; and said circuit including means for rendering said signals from said source ineffective to trigger said element when said element is in its astable state.

5. A binary storage circuit comprising: a monostable element having a stable low voltage state and an astable high voltage state comprising a tunnel diode, an inductor, and a voltage source in series, the voltage of said source having a magnitude to bias said element at its stable low voltage state; a two-phase clock signal generator; means connected to said generator and responsive to clock signals for applying triggering signals to the junction between said inductor and said diode, said triggering signals having a magnitude sufficient to trigger said element to its astable high voltage state, the time interval between the phases of said clock signal being less than the interval of the astable state of said element during which the triggering signals are ineffective to trigger said element.

6. An information storage circuit comprising: a tunnel diode; an inductor in series with said tunnel diode; a voltage source in series with said tunnel diode and said inductor, said voltage having a magnitude to bias said diode at a point below the low-voltage current peak of the characteristic curve of said tunnel diode; a multiphase clock signal generator; means connecting said generator to the junction between said inductor and said tunnel diode for applying triggering signals to said junction in response to clock signals, the magnitude of the signals applied to said junction being sufficient to cause a voltage across said diode greater than the voltage corresponding to said current peak of said characteristic curve of said diode; and means for selectively inhibiting the application of triggering signals to said junction.

7. An information storage circuit comprising: a monostable element having a stable and an astable state and adapted to produce an output signal upon being triggered to its astable state; a cyclically operable multiphase clock signal source producing clock signals for triggering said element to its astable state, said element being incapable of being triggered when in its astable state, and the time interval of the astable state of said element during which signals from said source are ineffective to trigger said element being at least equal to the period of the cycle of operation of said source whereby said element can be triggered during only one phase of each cycle of operation of said source; means connecting said source to said element; and a delay device connected to receive said output signal when said element is triggered for delaying said output signal for transmission from said delay device during a predetermined phase of said multiphase clock signal.

8. An information representing system wherein each of a plurality of items of information is represented by circuit activity during a corresponding time interval, comprising: a cyclically operable multiphase signal generator each phase corresponding to a respective one of said items of information; an information representing circuit connected to receive signals of all phases of said generator and responsive to a signal of any phase of said generator to assume a condition in which said circuit is unresponsive to subsequent signals from said generator for a time at least equal to the period of the cycle of operation of said generator whereby an item of information is represented by said circuit by the fact of being responsive to the signal of a corresponding phase of said multiphase signal and being unresponsive to signals of the other phases.

9. An information representing system wherein each of a plurality of items of information is represented by circuit activity during a corresponding time interval, comprising: a cyclically operable multiphase signal generator each phase corresponding to a unique item of information; and a circuit element responsive to a signal from said generator to assume a condition in which it is unresponsive to subsequent signals from said generator for a time at least equal to the period of the cycle of operation of said generator whereby an item of information is represented by said element by the fact of being responsive to the signal of a corresponding phase of said multiphase signal and being unresponsive to signals of the other phases; and means for changing the information representing condition of said element to represent a different item of information including means for inhibiting response of said element to the signal of the phase of said multiphase signal corresponding to the present information representing state of said element and causing said element to respond to the signal of the phase of said multiphase signal corresponding to said different item of information.

10. An information representing system wherein each of a plurality of items of information is represented by circuit activity during a corresponding time interval, comprising: a cyclically operable multiphase signal generator each phase corresponding to a unique item of information; and a circuit element responsive to a signal from said generator to assume a condition in which it is unresponsive to subsequent signals from said generator for a time at least equal to the period of the cycle of operation of said generator whereby an item of information is represented by said element by the fact of being responsive to the signal of a corresponding phase of said multiphase signal and being unresponsive to signals of the other phases; a plurality of normally armed gating circuits connected between said generator and said element, one for each of said phases, for separately applying triggering signals to said element in response to clock signals of the respectively corresponding phase; and means for changing the information representing condition of said element including means for disarming the gating circuit corresponding to the phase on which said element was triggered during the previous cycle of operation of said generator.

11. An information shift register comprising: a multiphase clock signal generator each phase corresponding to a unique item of information, said generator having a separate output terminal for each phase; a plurality of stages each including at least one monostable element having a triggering input terminal, said element producing an output signal when triggered in response to a signal from said generator for representing an item of information in accordance with the phase of said multiphase signal on which it is triggered, said element including means operable upon the triggering of said element on one of said phases for inhibiting the triggering of said element until the occurrence of the next signal of said one of said phases, and each of said stages having a separate input gating circuit connecting the triggering input terminal of each stage to a respective output terminal of said generator; means for receiving information representing input signals for controlling the gating circuits of the first stage of said shift register for conditioning said first stage to be triggered on the phase of said multiphase signal corresponding to the information represented by said input signals; a source of shift signals; means for applying said shift signals to the input gating circuits of said stages; and means coupling the output signal of each stage to an input gating circuit of the next successive stage, the input gating circuit of said successive stage being jointly responsive to said shift signals and an output signal from the previous stage to condition said successive stage to be triggered on the phase on which said previous stage was last triggered.

12. A binary counting circuit comprising: a two-phase clock signal generator having separate first phase and second phase output terminals and producing at respective ones of said output terminals first phase and second phase clock signals; a plurality of ordered counter stages each including at least one monostable element having a triggering input terminal and producing when triggered a first inhibiting output signal in coincidence with the occurrence of the next clock signal and a second inhibiting output signal in coincidence with the clock signal following said next clock signal said element including means rendering the element incapable of being triggered in response to the next pulse of the clock phase following the pulse in response to which said element was triggered; first and second gating circuits for each stage for connecting respective said first and second output terminals of said generator to the triggering input of each element; means for receiving inhibiting input pulses to be counted in coincidence with the clock signals of said first phase and for applying said input pulses to said first gating circuit of each of said stages; means responsive to said input pulses for producing delayed inhibiting input pulses in coincidence with the clock signals of said second phase and for applying said delayed input pulses to said second gating circuits of each of said stages; means for applying said second output signal of each stage to both input gating circuits of the same stage and to said second input gating circuit of each higher order stage; and means for applying said first output signal to said first input gating circuit of each higher order stage.

13. An information representing system wherein each of a plurality of items of information is represented by circuit activity during a corresponding time interval, comprising: a cyclically operable multiphase signal generator each phase corresponding to a respective one of said items of information; a circuit element connected to receive signals of all phases from said multiphase generator and operable to be triggered thereby; and means responsive to a signal produced when said element is triggered by a signal of any one of said phases for inhibiting the receipt by said element of all signals from said generator except the signals of the phase on which said element was triggered.

14. An information representing system wherein each of a plurality of items of information is represented by circuit activity during a corresponding time interval, comprising: a cyclically operable multiphase signal generator each phase corresponding to a respective one of said items of information; a circuit element connected to receive signals of all phases from said multiphase generator and operable to be triggered thereby; and means operable upon the triggering of said element by a signal of any one of said phases for inhibiting the triggering of said element by signals of the other phases.

15. An information representing system wherein each of a plurality of items of information is represented by circuit activity during a corresponding time interval, comprising: a signal generator for producing a plurality of separate nonoverlapping series of iterative signals, each series corresponding to a respective one of said items of information; an information representing circuit connected to receive said signals of all of said series signals from said generator and responsive to receipt of a signal of any one of said series of signals for assuming a predetermined condition of activity; and means responsive to said predetermined condition of said circuit to inhibit the response of said circuit to signals of any other of said series of signals.

16. An information representing system wherein each of a plurality of items of information is represented by circuit activity during a corresponding time interval, comprising: a signal generator for producing a plurality of separate nonoverlapping series of iterative signals, each series corresponding to a respective one of said items of information; an infromation representing circuit connected to receive said signals from said generator and responsive to receipt of a signal of one of said series of signals for assuming a predetermined condition of activity; means responsive to said predetermined condition of said circuit to inhibit the response of said circuit to signals of the other of said series of signals; and means for changing the information representing condition of said circuit including means for inhibiting the response of said circuit to signals of all except a selected series of said signals.

17. A pulse counting circuit comprising: a two-phase clock signal generator producing separate first and second phase clock signals; a plurality of ordered counter stages each including at least one monostable element capable of being triggered in response to said clock signals and including means rendering said element incapable of being triggered in response to the next clock signal following the clock signal in response to which said element is triggered, each of said elements representing binary information according to the phase of clock signals on which it is triggered, and each of said stages producing output signals in coincidence with the signals of said clock phases; means for applying said clock signals to each of said stages; means for receiving input signals to be counted in coincidence with the signals of said first phase clock signals; means for producing a delayed input signal in coincidence with the signals of said second phase clock signals; means for applying said input signals and delayed input signals to each of said stages whereby the information representing state of the lowest order stage is changed in response to each input signal and the information representing state of the higher order stages is changed in joint response to said input signals and said output signals from each lower order stage in accordance with binary progression.

References Cited by the Examiner

UNITED STATES PATENTS

| | | | |
|---|---|---|---|
| 2,435,207 | 2/48 | Dimond | 328—179 X |
| 2,802,105 | 8/57 | Odden | 328—63 |
| 3,001,140 | 9/61 | Beck | 328—195 |
| 3,040,186 | 6/62 | Van Duzer | 307—88.5 |
| 3,048,785 | 8/62 | Cartier | 328—62 |

FOREIGN PATENTS

| | | |
|---|---|---|
| 209,874 | 8/57 | Australia. |

ARTHUR GAUSS, *Primary Examiner.*

JOHN W. HUCKERT, *Examiner.*